United States Patent Office 2,924,953
Patented Feb. 16, 1960

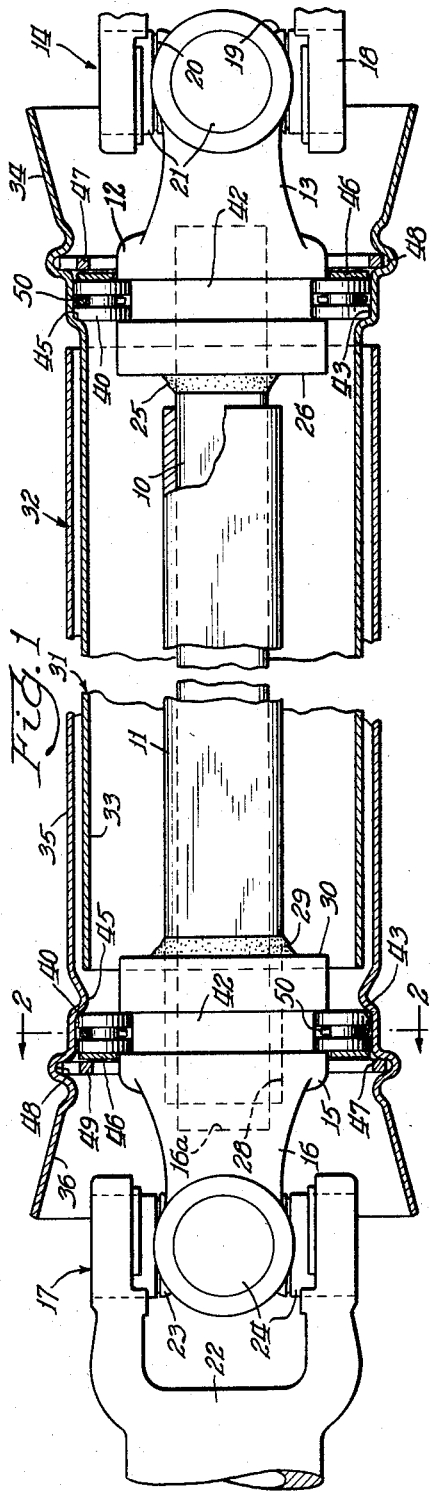

2,924,953

SHIELD ASSEMBLY

Charles Edward Cooney, Jr., Rockford, Ill., assignor to Borg-Warner Corporation, Chicago, Ill., a corporation of Illinois Application January 14, 1957, Serial No. 633,909

4 Claims. (Cl. 64—4)

The present invention relates generally to guard covers for drive mechanisms and is more particularly concerned with the bearing means for rotatably mounting such guard covers around rotating driving mechanisms in order to protect the operator controlling such drive mechanisms from injury during the operation thereof.

The present invention comprises an improved bearing means for a guard in the form of a telescopic shield assembly of the type disclosed in the co-pending application of A. A. Warner, Serial No. 502,315, filed April 19, 1955, now Patent No. 2,796,749.

The principal object of the present invention is to provide an improved cage mechanism for maintaining the proper peripheral spacing of the bearing members during operation of the rotating drive mechanism around which the telescopic shield assembly is mounted.

An advantage of the improved cage mechanism for mounting the bearing means, as disclosed herein, arises by reason of the fact that the bearing cage is sufficiently rigid to insure that the bearings will at all times be maintained in peripheral alignment.

The foregoing objects and advantages and numerous others will become apparent from the following detailed description when read in conjunction with the accompanying drawing, wherein:

Fig. 1 is a longitudinal view, shown partly in section, of a drive mechanism comprising telescoping shafts, having a guard cover disposed therearound and supported by means of bearings held in position by means of the improved bearing cage of the present invention;

Fig. 2 is a cross sectional view taken substantially along the line 2—2 in Fig. 1 and looking in the direction of the arrows;

Fig. 3 is a detail view of the cage members for mounting the roller bearings;

Fig. 4 is a detail view of the washer disposed adjacent the bearings; and

Fig. 5 is a detail view of the spring retainer for preventing axial movement of the bearing members with respect to the shield assembly.

With reference to the drawing, wherein like reference numerals have been used in the different figures to identify identical parts, the drive mechanism comprises a pair of torque transmitting members or telescoping axially aligned shafts 10 and 11, the solid shaft 10 being positioned within the sleeve shaft 11 and connected to a hub 12 of a yoke 13 of a universal joint 14. The sleeve shaft 11 is connected to the hub 15 of a yoke 16 of a universal joint 17. The universal joint 14 comprises, in addition to the yoke 12, a yoke 18 connected by an intermediate transmission member or spider 19 having four trunnions 20 disposed ninety degrees apart and received within bearing cups 21 held by the arms of the yokes of the universal joint 14. The universal joint 17 is identical to the universal joint 14, and comprises, in addition to the yoke 16, a yoke 22, spider 23 and bearing cups 24.

The solid shaft 10 is rectangular in cross section, as seen in Fig. 2, and has one end extending within a similarly shaped opening in the hub 12 of yoke 13, the shaft 10 being secured to the hub 12 by a weld 25 connecting the shaft to the flat end surface 26 of the hub 12. The sleeve shaft 11 is also rectangular in cross section, in order to receive the similarly shaped shaft 10 therein, and has one end extending within the similarly shaped opening 28 in the hub 15 of the yoke 16, the shaft 11 being secured to the hub 15 by a weld 29 connecting the shaft to the flat end surface 30 of the hub 15. The shaft 11 is spaced from the yoke 13 and the shaft 10 is spaced from the end wall 16a of the hub 15 and thus, during operation of the assembly, the shafts 11 and 10 may telescope with respect to each other in order to accommodate the necessary distance between the driving and driven elements to be interconnected with each other by the assembly. Assuming that the universal joint 17 is connected to a driving shaft which is rotating, the yoke 22 thereof will cause rotation of the yoke 16, sleeve shaft 11, shaft 10 and universal joint 14, which will drive a driven shaft connected to the universal joint 14. By the telescoping arrangement of shafts 10 and 11 relative axial displacement between these two shafts is permitted which may be occasioned by relative body displacement of the universal joints 14 and 17 as may be required when the assembly is used between the power take-off shaft of a farm tractor and an implement connected thereto, for example.

In utilizing rotating drive mechanisms, are described above, in machines where the mechanisms are exposed, such as when the mechanisms are used between a farm tractor and an implement, considerable danger of injury to the operator of the tractor and implement is possible. By providing a shield or guard to cover the drive mechanism, this danger of injury is considerably minimized, however, it is essential that the shield or guard be rotatable with respect to the guard mechanism and easily removed when it is necessary for servicing, etc., by a simple hand tool, such as a screw driver. The shield or cover guard comprises a pair of telescoping tubes 31 and 32, preferably formed of sheet metal and supported on the hubs 12 and 15 of yokes 13 and 16, respectively, for enclosing shafts 10 and 11 and the major portion of the universal joints 14 and 17. The tube 31 has a cylindrical portion 33 which surrounds shafts 10 and 11 and is provided with a flared end defining a frusto-conical or bell-shaped portion 34 which surrounds the yoke 13 and portions of the universal joint 14. The tube 32 is larger in diameter than the tube 31, in order to telescope around or over the tube 31, but is otherwise quite similar to the tube 31. The tube 32 has a cylindrical portion 35 surrounding and telescoping the cylindrical portion of the tube 31 and has a flared frusto-conical end portion 36 for partially enclosing yoke 16 and the other portions of the universal joint 17.

The tubes 31 and 32 are supported and rotate with the shafts 10 and 11 but may be stopped or rotated relative to the shafts if the operator of the tractor and farm implement interconnected by the shafts should fall or step on the shield during rotation of the shafts.

In order to permit rotation of the shafts 10 and 11 relative to the tubes 31 and 32 and to also permit axial movement of the tubes 31 and 32 along with the shafts 10 and 11, dumbbell-shaped rollers 40 are disposed between the yokes 13 and 15 and the tubes 31 and 32. More particularly, six rollers 40 are spaced between each of the yokes and the respective tubes, the rollers being received within an annular groove or raceway 42 formed in each of the hubs 12 and 15, and a raceway 43 formed by the inner cylindrical surface of the respective tubes 31 and 32. The rollers are prevented from moving axially of the hubs 12 and 15 due to engagement of the rollers with the sides of the raceways and the rollers are prevented from moving axially with respect to the tubes 31 and 32 by reason of their being in abutment with circular ribs 45 projecting inwardly from each of the sleeves. The rollers are held in abutment with the ribs 45 by means of washers 46 disposed immediately adjacent to the rollers and the washers are, in turn, held against axial displacement by means of substantially annular expansion springs or snap rings 47 which are seated in suitable grooves 48 in the inner surface of the tubes 31 and 32. The springs 47 are split, as shown in Fig. 5 and are provided with indentations 49 which project radially inwardly when the springs are seated within grooves 48 in order to engage the outer peripheries of the washers 46 to retain them in fixed axial positions. The indentations 49 are also adapted to receive the end of a screw driver in order to facilitate compression of the springs when it is desired to remove the tubes 31 and 32 from engagement with the shafts 10 and 11.

In order to provide suitable means for maintaining the rollers 40 peripherally spaced around the hubs 12 and 15, suitable cage means are provided. Such cage means comprise a pair of semi-circular flat members 50 which are each formed with radially inwardly directed slots 51 for receiving the reduced intermediate portion or central region of each of the rollers 40 therein. It will be noted that the cage members 50 have a radial dimension slightly less than the diameters of the rollers so as to insure that the cage members will be clear of both of the raceways 42 and 43. Each of the slots 51 is substantially U-shaped and the sides of each of the slots are spaced apart by an amount slightly less than the diameter of the central region of each of the rollers 40, with the slots being cut away at the deepest part of each slot to provide a substantially circular opening 52 of slightly greater diameter than the diameter of the central region of the rollers in order to permit free rotation of the rollers within the slots when the rollers are completely inserted therein.

If it becomes necessary for some reason to remove the rollers 40 from the cage members 50, it is only necessary to exert relative pressure on the rollers and cage members and the natural resilience of the cage members permits the slots to open slightly to thereby enable removal of the rollers from the cage members. Similarly, the rollers can be replaced within the slots by snapping them into the slots.

When the rollers are assembled in the cage members 50, the two cage members are disposed on opposite sides of the races 42 in the hubs 12 and 15 and the sleeve member or tube 31 or 32 is drawn into position whereby the rollers are disposed within the respective races 43. The washer 46 is then inserted adjacent the rollers and the snap ring 47 is inserted into the inwardly opening groove 48 in order to retain the rollers within the outer race 43. The cage members 50 are just slightly less than semi-circular so as to permit free insertion of the bearings into the assembly but when the bearing is in operation, the ends of the cage members 50 substantially abut one another in order to retain the proper peripheral spacing between the rollers 40. Due to the fact that the cage 50 is relatively rigid there is no serious tendency for the rollers 40 to become skewed which is one of the more serious drawbacks with a relatively more fragile or resilient cage.

Due to the positive means for retaining the rollers against axial displacement between the races within which they are disposed, the bearing means disclosed herein functions so as to cause the guard covers 31 and 32 to cover the shafts 10 and 11 at all times. As a result, the guard cover or shield assembly functions more satisfactorily than with prior similar constructions.

It is contemplated that numerous changes and modifications may be made in the present invention without departing from the spirit or scope thereof.

What is claimed is:

1. Bearing means adapted to be disposed between a pair of relatively rotatable concentric members which respectively define radially inwardly and outwardly facing races, said bearing means comprising a plurality of substantially dumbbell-shaped roller bearings disposed between said races, each of said roller bearings having a central groove between roller portions at either end thereof and defining a central region of a predetermined reduced diameter, and cage means for maintaining predetermined peripheral spacing of said roller bearings between said races, said cage means comprising two generally circular substantially flat rigid members formed with radially extending peripherally spaced generally U-shaped means defining slots therein for respectively receiving the central region of each of the roller bearings and thereby rotatably mounting the respective roller bearings within the cage means.

2. Bearing means adapted to be disposed between a pair of relatively rotatable concentric members which respectively define radially inwardly and outwardly facing races, said bearing means comprising a plurality of substantially dumbbell-shaped roller bearings disposed between said races, each of said roller bearings having a central groove between roller portions at either end thereof and defining a central region of a predetermined reduced diameter, and cage means for maintaining predetermined peripheral spacing of said roller bearings between said races, said cage means comprising semi-circular substantially flat rigid metal members formed with radially inwardly opening peripherally spaced means defining slots for respectively receiving the central region of each of the roller bearings and thereby rotatably mounting the respective roller bearings within the cage means, the radially inner portion of each of said slots being slightly smaller than the diameter of the central region of the roller bearings, whereby the cage members permit insertion of the roller bearings into the respective slots and the cage members thereafter retain the roller bearings in the slots.

3. In combination, a rotatable shaft, a universal joint at one end of said shaft and including a member connected to one end of the shaft for rotation with said universal joint and having an annular channel, a tubular guard surrounding said shaft and universal joint and having an annular groove and rib on its inner surface in axially spaced relation to each other, a plurality of dumbbell-shaped roller bearings between said guard and said member and positioned in said channel in said member and engaging the inner surface of said guard between said rib and groove of said guard, cage means for maintaining predetermined peripheral spacing of the roller bearings between the channel and the inner surface of said guard, said cage means comprising semi-circular substantially flat rigid metal members formed with radially extending peripherally spaced generally U-shaped means defining slots therein for respectively receiving the central region of each of the roller bearings and thereby rotatably mounting the respective roller bearings within the cage means, one end of each of said roller bearings abutting said rib, and stop means cooperable with said annular groove and disposed in abutment with the opposite end of each of said roller bearings for preventing axial movement of the roller bearings with respect to the guard.

4. The combination, as defined in claim 3, wherein said stop means comprises a washer disposed adjacent the other end of each of the roller bearings and a retainer ring seated within said annular groove for preventing axial displacement of the washer.

References Cited in the file of this patent

UNITED STATES PATENTS 2,198,376    Cederberg    Apr. 23, 1940
2,796,749    Warner    June 25, 1957

FOREIGN PATENTS 785,957    France    May 27, 1935